United States Patent
Bylander et al.

(10) Patent No.: US 6,226,438 B1
(45) Date of Patent: May 1, 2001

(54) THERMALLY MANAGED PACKAGE FOR FIBER OPTIC BRAGG GRATINGS

(75) Inventors: James R. Bylander; Grieg A. Olson; Martin G. Afflerbaugh, all of Austin, TX (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/524,862

(22) Filed: Mar. 14, 2000

(51) Int. Cl.$^7$ .................................................. G02B 6/44
(52) U.S. Cl. ......................... 385/136; 385/37; 385/135; 385/137
(58) Field of Search .............................. 385/37, 135, 136, 385/137

(56) References Cited

U.S. PATENT DOCUMENTS

| | | | |
|---|---|---|---|
| 4,359,262 | * 11/1982 | Dolan | 350/96.2 |
| 4,846,343 | * 7/1989 | Rupert | 206/303 |
| 5,042,898 | 8/1991 | Morey et al. | 385/37 |
| 5,323,479 | * 6/1994 | Allen | 385/135 |
| 5,384,875 | * 1/1995 | Shannon et al. | 385/51 |
| 5,479,548 | * 12/1995 | Coté et al. | 385/51 |
| 5,715,265 | 2/1998 | Epworth | 372/38 |
| 5,757,540 | 5/1998 | Judkins et al. | 359/341 |
| 5,887,107 | * 3/1999 | Newman et al. | 385/137 |
| 6,044,189 | 3/2000 | Miller | 385/37 |

FOREIGN PATENT DOCUMENTS

| | | |
|---|---|---|
| 0 766 359 B1 | 7/1999 | (EP) . |
| 2 772 488 | 6/1999 | (FR) . |
| WO 98/59267 | 12/1998 | (WO) . |

OTHER PUBLICATIONS

International Search Report for PCT/US00/19805 (Oct. 2000).

* cited by examiner

Primary Examiner—John D. Lee
Assistant Examiner—Jennifer Doan
(74) Attorney, Agent, or Firm—John A. Fortkort

(57) ABSTRACT

A package is provided for an optical fiber that includes a Bragg grating. The package includes a retaining member that supports the optical fiber and contacts the optical fiber along at least substantially the entire length of the Bragg grating. A housing is provided which is adapted to receive the retaining member therein. The housing has a conductivity below that of the retaining member so that the Bragg grating is maintained at a substantially uniform temperature.

47 Claims, 1 Drawing Sheet

THERMALLY MANAGED PACKAGE FOR FIBER OPTIC BRAGG GRATINGS

FIELD OF THE INVENTION

The present invention relates generally to a package for an optical Bragg grating fiber, and more particularly, to a package for an optical Bragg grating fiber that maintains a substantially uniform temperature along the grating.

BACKGROUND OF THE INVENTION

A conventional Bragg grating comprises an optical fiber in which the index of refraction undergoes periodic perturbations along its length. The perturbations may be equally spaced in the case of an unchirped grating, or may be unequally spaced in the case of a chirped grating. The grating reflects light over a given waveband centered around a wavelength equal to twice the spacing between successive perturbations. The remaining wavelengths pass essentially unimpeded. Such Bragg gratings are typically employed in a variety of application including filtering, stabilization of semiconductor lasers, reflection of fiber amplifier pump energy, and compensation for fiber dispersion.

Both the refractive index of the grating and the distance between successive perturbations are temperature dependent. As a result, the reflected waveband is also temperature dependent. In many cases, however, it is desirable to provide a stabilized reflection band that is temperature independent. U.S. Pat. No. 5,042,898 (Morey et al.) discloses a temperature-independent Bragg grating in which wavelength changes resulting from changes in strain are used to compensate for wavelength changes resulting from variations in the temperature of the grating. For example, a constant wavelength of reflected light may be maintained during a drop in temperature by increasing the longitudinal strain on the fiber. In this reference, a portion of the optical fiber containing the grating is sectioned off by securing the optical fiber at each side of the grating to separate metallic compensating members arranged for longitudinal movement relative to one another. By mechanically adjusting the compensating members longitudinal relative to each other to thereby vary the distance between them, there is imposed on the optical grating a longitudinal strain of a magnitude that varies to balance out wavelength variations resulting from changes in the temperature of the grating. This known temperature compensating package however, is cumbersome and expensive to manufacture.

In some cases, the precise value of the center wavelength of the reflection band is not very critical. This is often the case with gratings that have a wide bandwidth, e.g., greater than 1 nm, such as very long dispersion compensating gratings. It is important, however, that the entire length of such a grating be maintained at the same temperature. Otherwise, portions of the grating at different temperatures will reflect different wavelengths, distorting rather than merely shifting the reflection band.

Accordingly, it would be desirable to provide a package for a Bragg grating that is relatively simple and inexpensive to manufacture, and which maintains the entire Bragg grating at a uniform temperature.

SUMMARY OF THE INVENTION

The present inventors have recognized that, in certain applications, a Bragg grating needs to be maintained at only a uniform temperature rather than a constant temperature. As a result, a package may be used to house the Bragg grating that is simpler and less expensive than a package that is employed when a constant temperature is required to be maintained.

In accordance with one aspect of the invention, a package is provided for an optical fiber that includes a Bragg grating. The package includes a retaining member that supports the optical fiber and contacts the optical fiber along at least substantially the entire length of the Bragg grating. A housing is provided which is adapted to receive the retaining member therein. The housing has a conductivity below that of the retaining member.

In accordance with another aspect of the invention, a package of the type described above is provided for an optical fiber that includes a Bragg grating. The package includes a retaining member that is formed as a ring having an outer surface around which the optical fiber is wound.

In accordance with yet another aspect of the invention, a package of the type described above is provided for an optical fiber that includes a Bragg grating. The package includes a retaining member that is formed from copper. In some embodiments, the housing is formed from a plastic material.

In accordance with another aspect of the invention, a package of the type described above is provided for an optical fiber that includes a Bragg grating. The package includes a housing and a fluidic material (for example, a gel) that substantially fills the housing to provide additional thermal stability.

In accordance with another embodiment of the invention, a package of the type described above is provided for an optical fiber that includes a Bragg grating. The package includes a housing which is provided with a circular groove for containing the retaining member.

DETAILED DESCRIPTION

Figure 1:
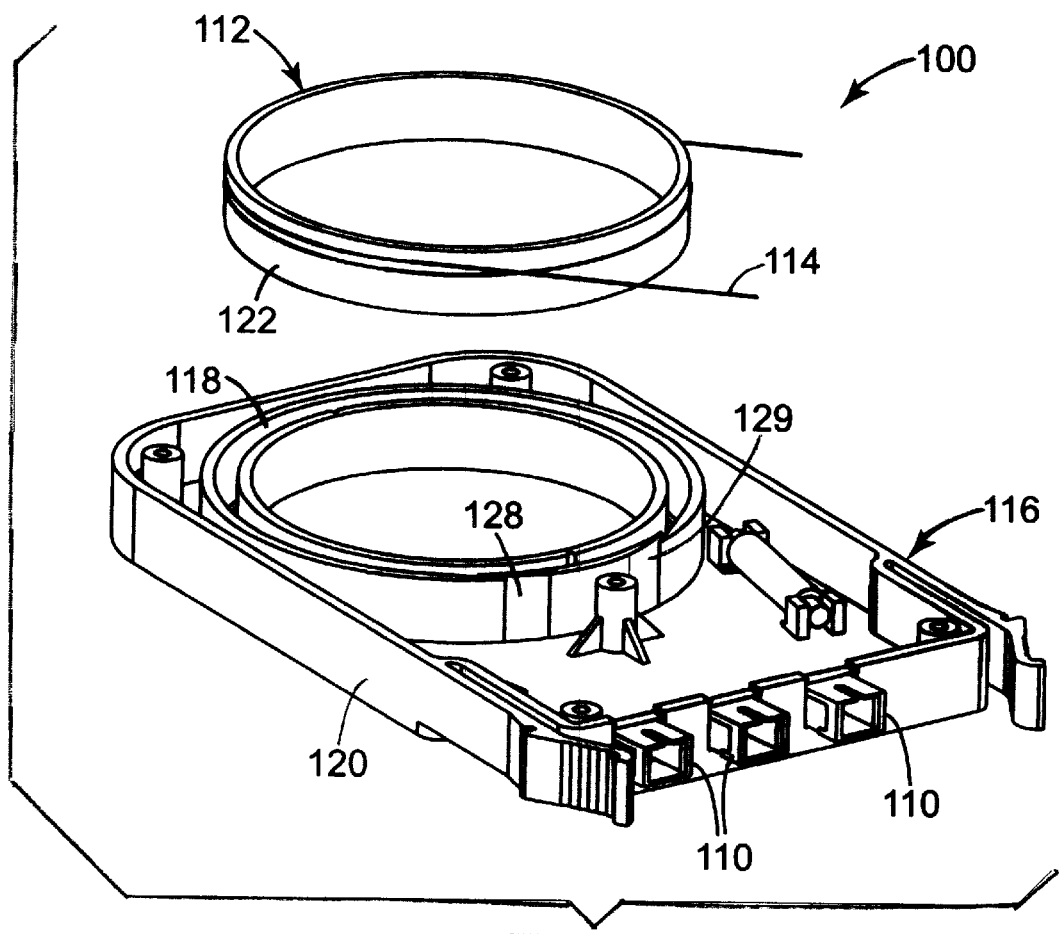
FIG. 1 shows a perspective view of the interior of one embodiment of a package for containing a Bragg grating fiber constructed in accordance with the present invention.
Figure 2:
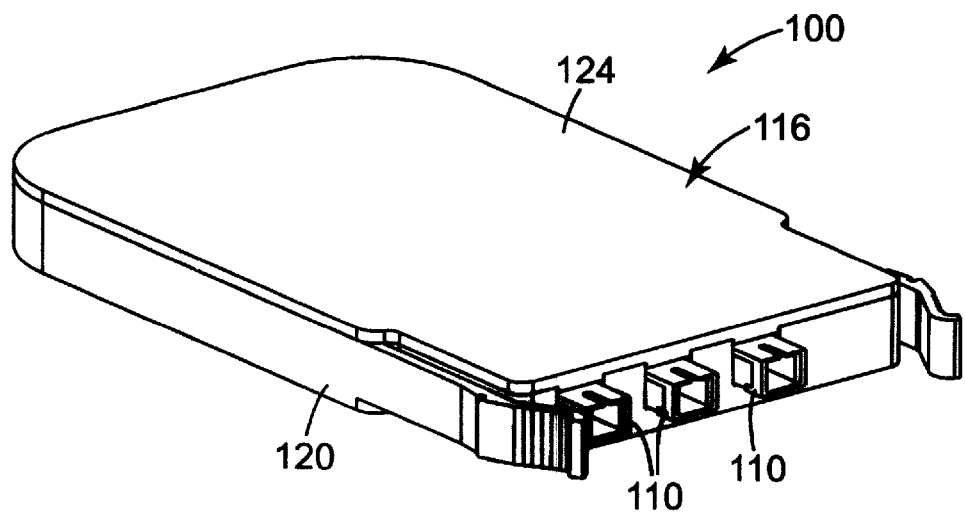
FIG. 2 shows a perspective view of the exterior of the package shown in FIG. 1.

FIGS. 1 and 2 are perspective views of one embodiment of the Bragg grating package 100 constructed in accordance with the present invention. The package includes a retaining member 112 that holds the fiber grating 114 in such a way that the retaining member and substantially the entire length of the Bragg grating fiber are in direct contact with one another. In the embodiment of the invention depicted in FIG. 1, the retaining member is formed as a ring that has an outer circumferential surface 122 about which the Bragg grating is wound. The retaining member is formed from a high thermally conducting material such as copper, which has a thermal conductivity of 401 W/m-K.

The retaining member is placed inside a thermally insulating housing 116 that may be formed from any of a number of materials, including a variety of different plastics. One example of such a plastic, which is believed to be a polystyrene/polypropylene blend or alloy, is currently available from the Dow Chemical Company, Midland, Mich. under the trade name Questra™. In another particular embodiment of the invention, the housing is formed from a resin available from Ciba-Geigy Corporation, Greensboro, N.C. under the trade name Cibatool®, which has a thermal conductivity of 0.2002 W/m-K.

In the embodiment of the invention shown in FIGS. 1 and 2, the housing includes first and second portions 120 and 124 (see FIG. 2) that engage one another to form a cavity therein. The first and second portions of the housing may be connected together by any convenient means, including fasteners, hinges or the like. The housing also includes feedthroughs 110 for passing the fiber and associated cables into and out of the housing. The interior of the housing accommodates a retaining member 112. For example, in the embodiment of the invention depicted in FIG. 1, the retaining member slides into a circular groove 118 located in the first or bottom portion of the housing. If the housing is formed from a plastic material, the circular groove may be integrally formed with the housing. When the retaining member is positioned in the circular groove, the fiber grating 114 exits the circular groove via slots 128 or 129. The slots may extend the full width of the groove, or alternatively, may extend over only a portion of the width of the groove.

The present invention advantageously ensures that the temperature of the Bragg grating remains substantially uniform even when the ambient temperature undergoes substantial fluctuations. For example, if the exterior of the housing is heated nonuniformly, the insulating material from which the housing is formed will appreciably reduce the rate of heat flow into the interior of the housing. Moreover, the heat that does penetrate the housing will be rapidly spread over the entire length of Bragg grating fiber by the high conductivity retaining member. As a result, the grating will quickly reach a new equilibrium temperature that is uniform along its entirety.

In some embodiments of the present invention, the housing may be filled with a gel to further improve performance. In one embodiment of the invention, the gel is a curable, petroleum-based thixotropic gel such as that available under the trade name Bufferite® from CasChem, Inc., Bayonne, N.J. An important advantage of this material is that it is a two-part gel that has a relatively low viscosity in its uncured state, which allows the housing to be easily filled. Once the gel is cured, it has a greater viscosity, preventing it from flowing or leaking out of the housing. The gel may fill substantially the entire housing or, alternatively, only the circular groove. In addition to improved thermal stability, these embodiments of the invention incorporating a gel also advantageously protect the Bragg grating fiber from humidity.

EXAMPLE 1

This example demonstrates the thermally stabilizing properties of the device of the present invention.

A device of the type depicted in FIG. 1 was provided which had a wall thickness of 0.125 inches. The device was fitted with a copper ring having a diameter of 3.375 inches and a thickness of 0.375 inches. A series of short Bragg grating fibers were placed on different portions of the outer circumference of the retaining member. Each grating served as a temperature sensor. The two portions of housing were then fastened together to seal the package.

A heat gun was used to heat the exterior of the package in a nonuniform manner such that a temperature differential of 40° C. over the exterior of the housing was achieved. The temperature difference was measured along different portions of the retaining member and was found to be less than 3° C. Thus, the temperature differential on the retaining member was reduced by a factor of ten over the temperature differential on the exterior of the package.

EXAMPLE 2

This example further demonstrates the thermally stabilizing properties of the device of the present invention.

The exterior of the housing of the device of EXAMPLE 1 was heated so that a temperature differential of about 55° C. was obtained. The resulting temperature differential along different portions of the retaining member was measured and found to be less than 14° C.

The results of EXAMPLES 1–2 indicate that, under realistic environmental conditions to which the package may be subjected, the temperature differential along the Bragg grating fiber should be much less than 0.5° C., which is the maximum temperature differential that is acceptable for a variety of applications.

The preceding description of the present invention is merely illustrative, and is not intended to be limiting. Therefore, the scope of the present invention should be construed solely by reference to the appended claims.

What is claimed is:

1. A package for an optical fiber that includes a Bragg grating, comprising:
   a retaining member supporting the optical fiber and contacting the optical fiber along at least substantially the entire length of the Bragg grating; and
   a housing adapted to receive the retaining member therein, said housing having a conductivity below that of the retaining member.

2. The package of claim 1, wherein said retaining member is formed as a ring having an outer surface around which the optical fiber is wound.

3. The package of claim 2, wherein said housing includes a circular groove for containing said retaining member.

4. The package of claim 1, wherein said retaining member is formed from copper.

5. The package of claim 1, wherein said housing is formed from a plastic material.

6. The package of claim 5, further comprising a fluidic material substantially filling said housing.

7. The package of claim 6, wherein said fluidic material is a gel.

8. The package of claim 7, wherein said gel is a thixotropic gel.

9. The package of claim 1, wherein said housing includes first and second portions.

10. The package of claim 9, further comprising a fastener for sealing together said first and second portions.

11. A package for an optical fiber that includes a Bragg grating, comprising:
    a conductive member supporting the optical fiber such that a given thermal gradient extending over the optical fiber is reduced at a first rate; and
    an insulating member adapted to house the conductive member therein, said insulating member reducing over its surface a thermal gradient equivalent to said given thermal gradient at a second rate that is less than said first rate.

12. The package of claim 11, wherein said conductive member is formed as a ring having an outer surface around which the optical fiber is wound.

13. The package of claim 12, wherein said insulating member includes a circular groove for containing said conductive member.

14. The package of claim 13, further comprising a fluidic material filling at least a portion of the insulating member.

15. The package of claim 14, wherein said fluidic material fills the circular groove of said insulating member.

16. The package of claim 11, wherein said conductive member is formed from copper.

17. The package of claim 11, wherein said insulating member is formed from a plastic material.

18. The package of claim 17, further comprising a fluidic material substantially filling said insulating member.

19. The package of claim 18, wherein said fluidic material is a gel.

20. The package of claim 19, wherein said gel is a thixotropic gel.

21. The package of claim 11, wherein said insulating member includes first and second portions.

22. The package of claim 21, further comprising a fastener for sealing together said first and second portions.

23. The package of claim 11, further comprising a fluidic material filling at least a portion of the insulating member.

24. The package of claim 23, wherein said fluidic material fills an interior cavity of the insulating member.

25. A device, comprising:
- an optical fiber equipped with a Bragg grating;
- a retaining member having an outer surface around which the optical fiber is wound, said retaining member contacting the optical fiber along substantially the entire length of the Bragg grating; and
- a housing adapted to receive said retaining member, said housing having a thermal conductivity below that of the retaining member.

26. The device of claim 25, wherein said retaining member comprises copper.

27. The device of claim 25, wherein said housing comprises a plastic.

28. The device of claim 25, further comprising a fluidic material disposed in said housing.

29. The device of claim 28, wherein said fluidic material substantially fills said housing.

30. The device of claim 28, wherein said fluidic material is a gel.

31. The device of claim 30, wherein said gel is a thixotropic gel.

32. The device of claim 30, wherein said gel is a petroleum-based gel.

33. The device of claim 25, wherein said housing includes first and second portions.

34. The device of claim 33, further comprising a fastener for sealing together said first and second portions.

35. A device, comprising:
- an optical fiber equipped with a Bragg grating;
- a thermally conductive member around which said optical fiber is wound, said conductive member contacting said optical fiber along substantially the entire length of said Bragg grating such that a given thermal gradient extending over said optical fiber is reduced at a first rate; and
- a thermally insulating housing member adapted to house the conductive member therein, said housing member reducing over its surface a thermal gradient equivalent to said given thermal gradient at a second rate that is less than said first rate.

36. The device of claim 35, wherein said housing member is equipped with a circular groove for containing said conductive member.

37. The device of claim 35, wherein said conductive member comprises copper.

38. The device of claim 35, wherein said housing member comprises a plastic.

39. The device of claim 35, wherein said housing member has a fluidic material disposed therein.

40. The device of claim 39, wherein said fluidic material is a gel.

41. The device of claim 40, wherein said gel is a thixotropic gel.

42. The device of claim 35, wherein said conductive member is equipped with a circular groove, and wherein said circular groove has a fluidic material disposed therein.

43. The device of claim 42, further comprising a fastener for sealing together said first and second portions.

44. A package for an optical fiber that includes a Bragg grating, comprising:
- a thermally conductive member supporting the optical fiber such that a given thermal gradient extending over the optical fiber is reduced at a first rate; and
- a thermally insulating member adapted to house the conductive member, said insulating member being at least partially filled with a fluidic material, said insulating member reducing over its surface a thermal gradient equivalent to said given thermal gradient at a second rate that is less than said first rate.

45. The package of claim 44, wherein said fluidic material is a gel.

46. The package of claim 45, wherein said gel is a thixotropic gel.

47. A package, comprising:
- an optical fiber equipped with a Bragg grating;
- a spool having an outer surface around which the optical fiber is wound, said spool supporting the optical fiber and contacting the optical fiber along substantially the entire length of said Bragg grating; and
- a housing having a groove therein which is adapted to receive said spool, said housing having a thermal conductivity below that of said outer surface of said spool.

* * * * *

UNITED STATES PATENT AND TRADEMARK OFFICE
CERTIFICATE OF CORRECTION

PATENT NO. : 6,226,438 B1  
DATED : May 1, 2001  
INVENTOR(S) : James R. Bylander, Grieg A. Olson and Martin G. Afflerbaugh Page 1 of 1

It is certified that error appears in the above-identified patent and that said Letters Patent is hereby corrected as shown below:

<u>Title page,</u>  
Item [56], References Cited, please add the following listed patents:  
-- 4,702,599 10/1987 Mohr . . . . . . . . . . . . . . . . . . . . . 356/350  
   5,208,652 5/1993 Sonobe et al. . . . . . . . . . . . . . . 356/350  
   5,245,687 9/1993 Usui . . . . . . . . . . . . . . . . . . . . . .385/134  
   5,416,585 5/1995 Hadeler . . . . . . . . . . . . . . . . . . 356/350  
   5,781,301 7/1998 Ruffin . . . . . . . . . . . . . . . . . . . 356/350 --

Signed and Sealed this

Sixteenth Day of April, 2002

Attest:

JAMES E. ROGAN  
*Attesting Officer*     *Director of the United States Patent and Trademark Office*